United States Patent
Meredith et al.

(10) Patent No.: US 9,911,129 B2
(45) Date of Patent: Mar. 6, 2018

(54) FACILITATING DEMOGRAPHIC ASSESSMENT OF INFORMATION USING TARGETED LOCATION OVERSAMPLING

(71) Applicant: AT&T Mobility II LLC, Atlanta, GA (US)

(72) Inventors: Sheldon Kent Meredith, Marietta (GA); Mark Austin, Roswell, GA (US); Jeremy Fix, Acworth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 404 days.

(21) Appl. No.: 14/271,046

(22) Filed: May 6, 2014

(65) Prior Publication Data

US 2015/0324824 A1    Nov. 12, 2015

(51) Int. Cl.
G06Q 30/02    (2012.01)
H04W 4/02    (2009.01)
H04W 4/20    (2009.01)

(52) U.S. Cl.
CPC ......... *G06Q 30/02* (2013.01); *G06Q 30/0205* (2013.01); *G06Q 30/0261* (2013.01);
(Continued)

(58) Field of Classification Search
CPC ............... G06Q 30/0261; G06Q 30/02; G06Q 30/0205; H04W 4/028; H04W 4/02; H04W 4/021; H04W 4/206
See application file for complete search history.

(56) References Cited

U.S. PATENT DOCUMENTS 5,781,704 A    7/1998  Rossmo
6,546,257 B1 *   4/2003  Stewart .................. H04L 67/18
                                                    340/988
(Continued)

FOREIGN PATENT DOCUMENTS

WO    2005098720 A3    10/2005
WO    2012166355 A1    6/2012

OTHER PUBLICATIONS

Tomintz, et al., "Privacy Matter—Health-Related Location-Based Services," GI_Forum 2012: Geovizualisation, Society and Learning, ISBN 978-3-87907-521-8, 10 pages.
(Continued)

*Primary Examiner* — Dinh P Nguyen
(74) *Attorney, Agent, or Firm* — Amin, Turocy & Watson, LLP

(57) ABSTRACT

Demographic assessment of information is facilitated using targeted location oversampling. In one example, a device determines mobile devices communicatively coupled to a base station device associated with a first defined region, wherein the first defined region is relative to a defined location of interest. The device can transmit a set of instructions to the mobile devices that instruct the mobile devices to power on respective location information components configured to transmit location information. The respective location information can be configured to transmit respective global positioning system information for the mobile devices. The device can also determine which ones of the mobile devices are within a second defined region based on respective location information received from the mobile devices.

19 Claims, 10 Drawing Sheets

(52) U.S. Cl.
CPC ............. *H04W 4/02* (2013.01); *H04W 4/028* (2013.01); *H04W 4/021* (2013.01); *H04W 4/206* (2013.01)

(56) References Cited

U.S. PATENT DOCUMENTS

| | | |
|---|---|---|
| 7,107,038 B2 | 9/2006 | Fitch et al. |
| 7,123,918 B1 | 10/2006 | Goodman |
| 7,848,765 B2 | 12/2010 | Phillips et al. |
| 8,301,765 B2 | 10/2012 | Goodman |
| 8,396,485 B2 | 3/2013 | Grainger et al. |
| 8,504,061 B2 | 8/2013 | Grainger et al. |
| 8,577,590 B2 | 11/2013 | Doyle |
| 8,606,260 B2 | 12/2013 | Chatterjee |
| 8,638,720 B2 | 1/2014 | Huang et al. |
| 8,743,782 B1* | 6/2014 | Patel ............ G01S 5/0242 370/328 |
| 9,084,013 B1* | 7/2015 | Arini ............ H04N 21/44204 |
| 2002/0046098 A1* | 4/2002 | Maggio ............ G06Q 30/02 705/14.19 |
| 2006/0080085 A1* | 4/2006 | Kalmus ............ H04M 1/72552 704/200 |
| 2006/0287916 A1* | 12/2006 | Starr ............ G06Q 30/02 705/14.46 |
| 2007/0264968 A1* | 11/2007 | Frank ............ G06Q 30/02 455/404.2 |
| 2008/0154675 A1* | 6/2008 | Lester ............ G06Q 30/0205 705/7.34 |
| 2008/0174485 A1 | 7/2008 | Carani et al. |
| 2009/0164459 A1* | 6/2009 | Jennings ............ H04W 4/02 |
| 2010/0056159 A1* | 3/2010 | Liu ............ H04W 36/32 455/440 |
| 2012/0076085 A1* | 3/2012 | Chou ............ H04W 68/00 370/329 |
| 2012/0136865 A1* | 5/2012 | Blom ............ G06F 17/30141 707/739 |
| 2012/0195295 A1* | 8/2012 | Elmaleh ............ H04W 4/023 370/338 |
| 2013/0006522 A1 | 1/2013 | Vellaikal et al. |
| 2013/0054315 A1* | 2/2013 | Shutter ............ G06Q 30/02 705/14.1 |
| 2013/0072230 A1* | 3/2013 | Bansal ............ H04W 4/02 455/456.2 |
| 2013/0196692 A1 | 8/2013 | Huang et al. |
| 2013/0244687 A1 | 9/2013 | Stargardt et al. |
| 2013/0318546 A1* | 11/2013 | Kothuri ............ G06Q 30/0201 725/12 |
| 2013/0337826 A1 | 12/2013 | Fix et al. |
| 2014/0040463 A1* | 2/2014 | Skvortsov ............ H04L 43/0876 709/224 |
| 2014/0253321 A1* | 9/2014 | Srinivasan ............ G08B 13/00 340/539.11 |

OTHER PUBLICATIONS

Varghese, "Reliance INFOCOMM's Strategy and Impact on the Indian Mobile Telecommunication Scenario," 'Telecom Demand: measures for improving Affordability' in the Media and Communications Department at London School of Economics Feb. 2005 till Feb. 2006, and the final paper written during December, 20 pages.
Anon, "Managerial Economic Analysis of the Impact of Social Commerce on E-commerce," Research Paper prepared student for Prof. TC Makemson, 21 pages.
Constandache, et al. "Enloc: Energy-efficient localization for mobile phones," INFOCOMM 2009, IEEE. IEEE, 2009, 5 pages.

* cited by examiner

FACILITATING DEMOGRAPHIC ASSESSMENT OF INFORMATION USING TARGETED LOCATION OVERSAMPLING

TECHNICAL FIELD

The subject disclosure relates generally to information processing, e.g., to facilitating demographic assessment of information using targeted location oversampling.

DETAILED DESCRIPTION

Figure 1:
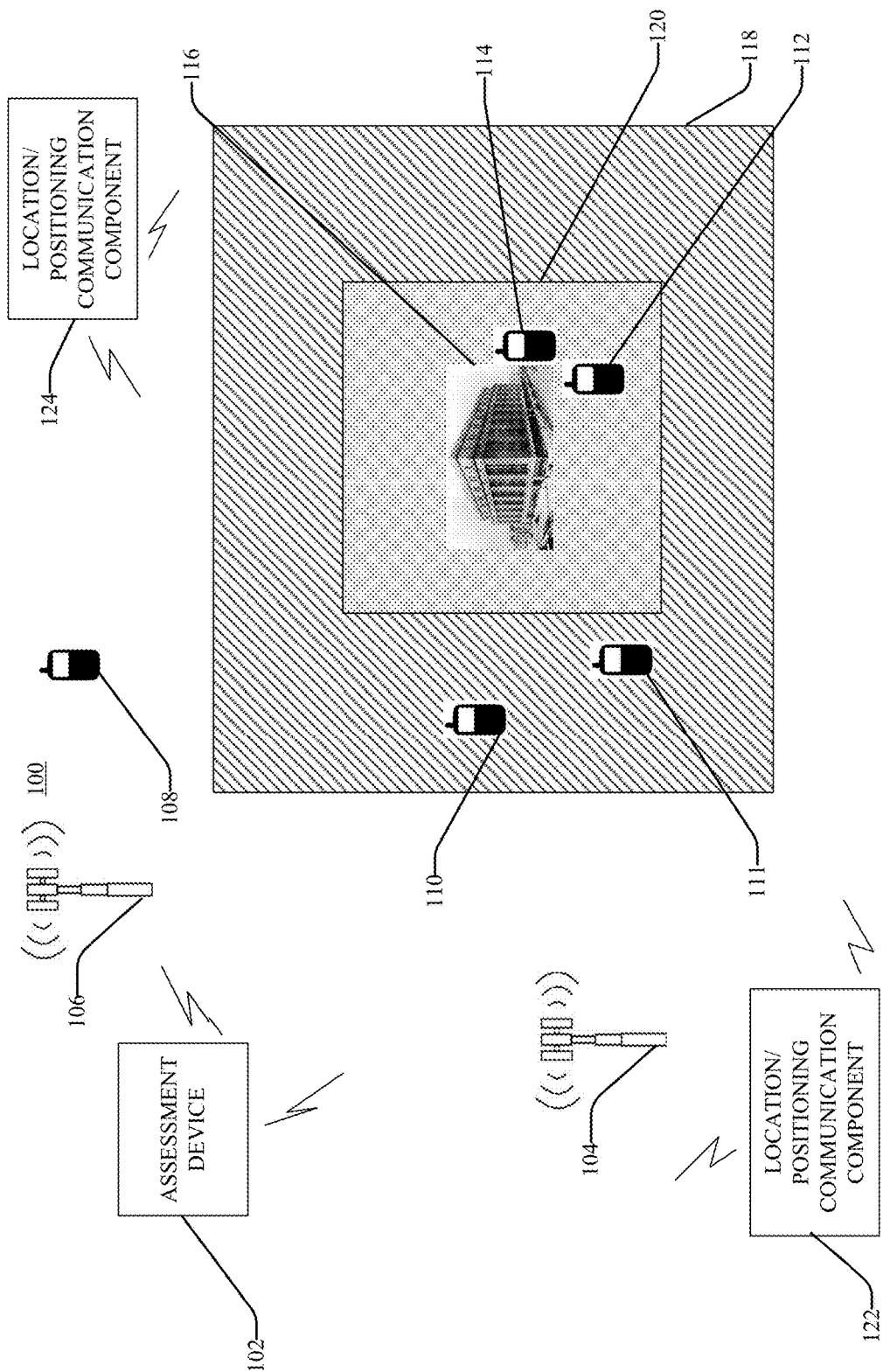
FIG. 1 illustrates an example block diagram of a system facilitating demographic assessment of information using targeted location oversampling in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

There is high value in mobile location information and this value can increase with accuracy of the mobile location information. Mobile location information transmitted by a mobile device can be passively collected. However, such information may unable to be obtain at any given time since the mobile device must typically actually be transmitting at the time of collection and the available information being transmitted must enable computation of a location of the mobile device. Notwithstanding passive collection of data can be sub-optimal, actively requesting location from the mobile device can have several problems as well. First, a global positioning system (GPS) receiver in a mobile device must typically be turned on to report location information and the radio network controllers are only able to process a small number of requests (e.g., 1 request per second), which tends to reduce the ability to have large-scale collection from hundreds of thousands of mobile devices continually. Additionally, continuously providing GPS information is power-intensive and can be incompatible with limited mobile battery life.

Further, the use of gateway mobile location centers (GMLCs)/gateway mobile positioning centers (GMPCs) can be expensive (e.g., about 2 million dollars for 100 transactions per second). The problem is exacerbated because there may be a need to gain accurate location information for millions of mobile devices.

In some cases, a retailer may want to know the effectiveness of an advertisement campaign that has been, or is being, conducted. Further, the retailer may want to know this information during or very soon after the campaign (e.g., within one to two days of the commencement or end of the campaign). Embodiments described herein can retrieve sufficient amounts of location information in a timely and efficient manner for providing demographics regarding identities associated with mobile users in the vicinity of the retail establishment. This demographic can be especially useful for retailers in assessing the effectiveness of the advertisement campaign.

Accordingly, embodiments described herein include systems, methods, apparatus and/or computer-readable storage media facilitating demographic assessment of identities associated with mobile devices using targeted location oversampling. In one embodiment, a method comprises determining, by a device comprising a processor, a set of mobile devices communicatively coupled to a base station device associated with a first defined region, wherein the first defined region is relative to a defined location of interest. The method also comprises transmitting, by the device, a set of instructions to the set of mobile devices that instruct the set of mobile devices to power on respective location information components configured to transmit location information. The method also comprises determining, by the device, which ones of the set of mobile devices are within a second defined region based on respective location information received from the set of mobile devices.

In another embodiment, an apparatus comprises: a processor; and a memory that stores executable instructions that, when executed by the processor, facilitate performance of operations. The operations comprise: determining a set of mobile devices communicatively coupled to a base station device associated with a first defined region, wherein the first defined region is relative to a defined location of interest; transmitting a set of instructions to the set of mobile devices that instruct the set of mobile devices to power on respective location information components configured to transmit location information; and determining which ones of the set of mobile devices are within a second defined region based on respective location information received from the set of mobile devices.

In another embodiment, a computer-readable storage device is provided. The computer-readable storage device stores computer-executable instructions that, in response to execution, cause a first device comprising a processor to perform operations. The operations comprise: determining a first region associated with an event of interest; and identifying ones of a first set of mobile devices within the first region within a defined time period based on location information received from the first set of mobile devices. The defined time period overlaps another time period for the event of interest. The location information is received in response to a signal controlling respective location information components of the first set of mobile devices to activate.

One or more embodiments can advantageously facilitate accurate and efficient identification of demographic information (e.g., ethnicity, gender, income, residential address) for identities associated with mobile devices at a particular retail establishment location during a retail event of interest. As such, business owners can reliably and quickly receive pertinent information about potential buyers, or buyers, possibly associated with, or within an area of, an advertisement campaign for the business.

Turning now to the drawings, FIG. 1 illustrates an example block diagram of a system facilitating demographic assessment of information using targeted location oversampling in accordance with one or more embodiments described herein. System 100 can include assessment device 102, mobile devices 108, 110, 111, 112, 114, BSs 104, 106 and/or location/positioning communication components 122, 124. In various embodiments, one or more of assessment device 102, mobile devices 108, 110, 111, 112, 114, BSs 104, 106 and/or location/positioning communication components 122, 124 can be electrically and/or communicatively coupled to one another to perform one or more functions of system 100.

In various embodiments, system 100 can be employed for accurately and efficiently identifying mobile devices within a particular region of interest through the use of oversampling and obtaining demographic information for the mobile devices within the particular region of interest. For example, a point of interest 116 is located within second region 120, which is located within first region 118. An event of interest is commencing or has commenced at point of interest 116. To enable assessment device 102 to accurately and efficiently determine which of mobile devices 108, 110, 111, 112, 114 are located within second region 120 for a defined time period (before, during or after the event of interest, as dictated by the specifications of the business entity associated with, or located at, point of interest 116), assessment device 102 can identify cell sites having coverage that comprises first region 118 and identify the mobile devices in first region 118 (thereby oversampling mobile devices). As such, during a first iteration of the process, assessment device 102 obtains a general idea of the area in which mobile devices 110, 111, 112, 114 are located.

During the second iteration of the process, assessment device 102 efficiently and accurately refines the location of mobile devices 110, 111, 112, 114 to determine which of mobile devices 110, 111, 112, 114 are located at second region 120 at which point of interest 116 is also located. Specifically, assessment device 102 can generate information to cause mobile devices 110, 111, 112, 114 to transmit the location information (e.g., GPS location) of mobile devices 110, 111, 112, 114. In one embodiment, assessment device 102 transmits a control signal causing mobile devices 110, 111, 112, 114 (or a location information component of mobile devices 110, 111, 112, 114) to activate for transmission of the respective location information for each of mobile devices 110, 111, 112, 114. In another embodiment, assessment device 102 generates information that causes one or more of location/positioning communication components 122, 124 to transmit a control signal causing mobile devices 110, 111, 112, 114 (or a location information component of mobile devices 110, 111, 112, 114) to activate for transmission of the respective location information for each of mobile devices 110, 111, 112, 114. Accordingly, battery life for mobile devices 110, 111, 112, 114 can be preserved since mobile devices 110, 111, 112, 114 transmit location information upon activation. Location information component of mobile devices 110, 111, 112, 114 can de-activate/power down after transmitting the location information.

In some embodiments, location/positioning communication components 122, 124 can include the structure and/or functionality of a GMLC/GPLC. In the embodiments described herein, location/positioning communication components 122, 124 are employed selectively and only in areas in which specific information needs to be determined for mobile devices within a particular distance of a point of interest.

In either embodiment of activation of respective location information components of mobile devices 110, 111, 112, 114, assessment device 102 can analyze location information received from mobile devices 110, 111, 112, 114 and determine which of mobile devices 110, 111, 112, 114 are within second region 120 at the defined time of interest (e.g., within a time period that overlaps with the time period of the event of interest). For example, mobile devices 112, 114 are within second region 120 at the defined time of interest as shown in FIG. 1. Assessment device 102 can generate demographic information for identities (e.g., users/owners) associated with mobile devices 112, 114. The process can be repeated if the number of mobile devices for which demographic information is needed to have a satisfactory likelihood of a meeting a defined confidence/reliability measure calls for demographic information from more mobile devices. In various embodiments, the process can be repeated over the time during which the event of interest is ongoing periodically (e.g., every two hours) or from time to time (e.g., randomly, at time designated by a controller of assessment device 102) or on an event-driven basis (e.g., if the number of mobile devices in first region 118 exceeds a value), as desired.

Figure 2:
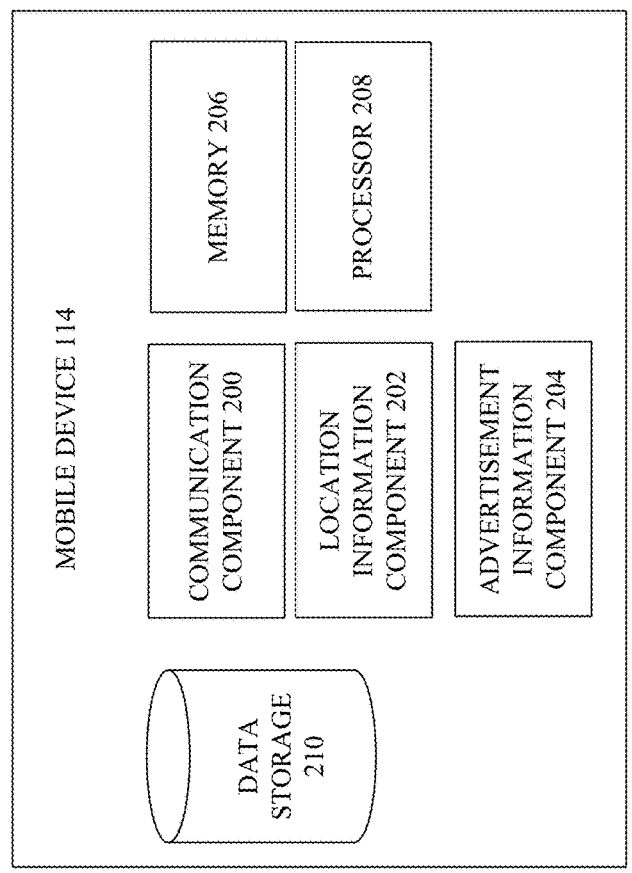
FIG. 2 illustrates an example block diagram of a mobile device for which demographic assessment can be performed in accordance with one or more embodiments described herein.

An example memory device (e.g., memory device 114) will be described in greater detail with reference to FIG. 2. In various embodiments, one or more of the structure and/or functionality of mobile device 114 can be or comprise the structure and/or functionality of one or more of mobile devices 108, 110, 111, 112. FIG. 2 illustrates an example block diagram of a mobile device for which demographic assessment can be performed in accordance with one or more embodiments described herein. Repetitive description of like elements employed in respective embodiments of systems and/or apparatus described herein are omitted for sake of brevity.

Mobile device 114 can be any device, comprising software, hardware or a combination of hardware and software, configured to communicate with one or more of BSs 104, 106 and/or transmit location information about location of mobiles devices 114 to or for use by assessment device 102. In various embodiments, mobile device 114 can communicate with any other mobile or stationary device to which mobile device 114 can communicatively couple via one or more of BSs 104, 106.

Mobile device 114 can move from one geographical location to another while remaining connected to one of BSs 104, 106. In the embodiment shown, two geographical regions are provided, first region 118 and second region 120. As shown, second region 120 is located within the boundaries of first region 118. Location of interest 116 is located within region 120. Mobile device 114 can be located in first region 118, in second region 120 or outside of first region 118. As shown, mobile device 108 is located outside of first region 118, mobile devices 110, 111 are located within first region 118 but outside of second region 120 and mobile devices 112, 114 are located within second region 120.

Mobile device 114 can comprise communication component 200, location information component 202, advertisement information component 204, memory 206, processor 208 and/or data storage 210. In various embodiments, one or more of communication component 200, location information component 202, advertisement information component 204, memory 206, processor 208 and/or data storage 210 can be electrically and/or communicatively coupled to one another to perform one or more functions of mobile device 114.

Communication component 200 can comprise software, hardware or a combination of software and hardware to transmit and/or receive information from and/or at mobile device 114. For example, in various embodiments, communication component 200 can transmit location information (e.g., GPS or other location information) about the location of mobile device 114. In various embodiments, the location information can also comprise, but is not limited to, latitude and longitude information and/or geographical indicators such as street, block or address information.

In some embodiments, communication component 200 can receive a request for location information from assessment device 102 and/or one or more of location/positioning communication components 122, 124. As another example, communication component 200 can receive a control signal configured to activate one or more components (e.g., location information component 202) of mobile device 114 for causing the one or more components to transmit location information for mobile device 114. In some embodiments, communication component 200 can receive GPS for use by a GPS receiver at mobile device. In other embodiments, communication component 200 can receive location information from other location/position systems configured to transmit information that can be employed to determine location of mobile device 114.

In some embodiments, communication component 200 can transmit the requested location information for use by assessment device 102. In some embodiments, communication component 200 transmits the location information to a repository from which the location information can be accessed by assessment device 102, location/positioning communication component 122, 124 or any number of other devices in or communicatively coupled to a network with mobile device 114.

Mobile device 114 also comprises location information component 202. Location information component 202 can comprise hardware, software and/or a combination of hardware and software configured to receive, process, determine and/or generate location information for transmission by communication component 200. In some embodiments, location information component 202 comprises the structure and/or functionality of a GPS receiver. Location information component 202 can also comprise one or more power control subsystems configured to power on and/or activate location information component 202 in response to a control signal for powering on and/or activating location information component 202. For example, with reference to FIGS. 1 and 2, communication component 200 can receive the control signal from assessment device 102 or one or more of location/positioning communication components 122, 124, and/or location information component 202 can power on and/or activate in response to the detection of the control signal (or information indicative of receipt of the control signal by mobile device 114) by location information component 202.

Advertisement information component 204 can comprise hardware, software and/or a combination of hardware and software configured to process and/or display advertisement or marketing information from an entity. Advertisement or marketing information can comprise, but is not limited to, a coupon, a set of directions to a retail establishment of interest or information about an event of interest (e.g., grand opening, sale, clearance) at a business establishment (e.g., museum, store). The advertisement and/or marketing information can be received by communication component 200 based on identification of mobile device 114 as being located within second region 120 (or, in some embodiments, first region 118) during a particular current or past time of interest.

Memory 206 can be a computer-readable storage medium storing computer-executable instructions and/or information for performing the functions described herein with reference to mobile device 114 (or a component of mobile device 114). For example, memory 206 can store computer-executable instructions that can be executed by processor 208 to perform communication, location determination, evaluation, decision-making or other types of functions executed by mobile device 114. Processor 208 can perform one or more of the functions described herein with reference to mobile device 114 (or a component of mobile device 114). For example, processor 208 can activate location information component 202 upon receiving a control signal for activation, determine and/or report GPS location information for mobile device 114 and/or process or display advertisement information at mobile device 114. Any number of different functions described herein for facilitating demographic assessment of information using targeted location oversampling can be employed utilizing processor 208.

Data storage 210 can be configured to store information accessed, received, processed and/or displayed by mobile device 114 (or a component of mobile device 114). For example, data storage 210 can store current and/or past location information about mobile device 114, advertisement and/or marketing information, an identifier for mobile device 114 or the like.

Figure 3:
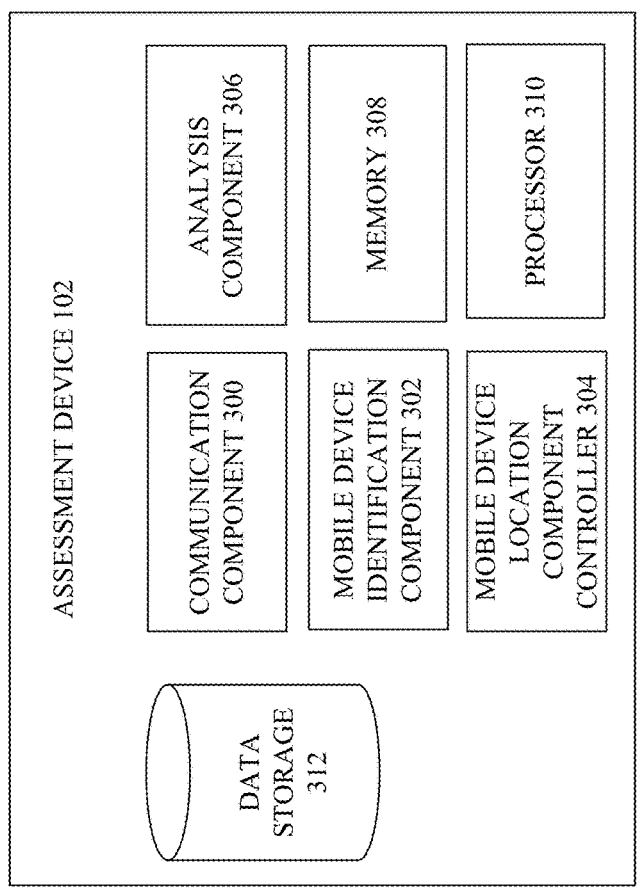
FIG. 3 illustrates an example block diagram of an assessment device that can facilitate demographic assessment of information using targeted location oversampling in accordance with one or more embodiments described herein.
Figure 4:
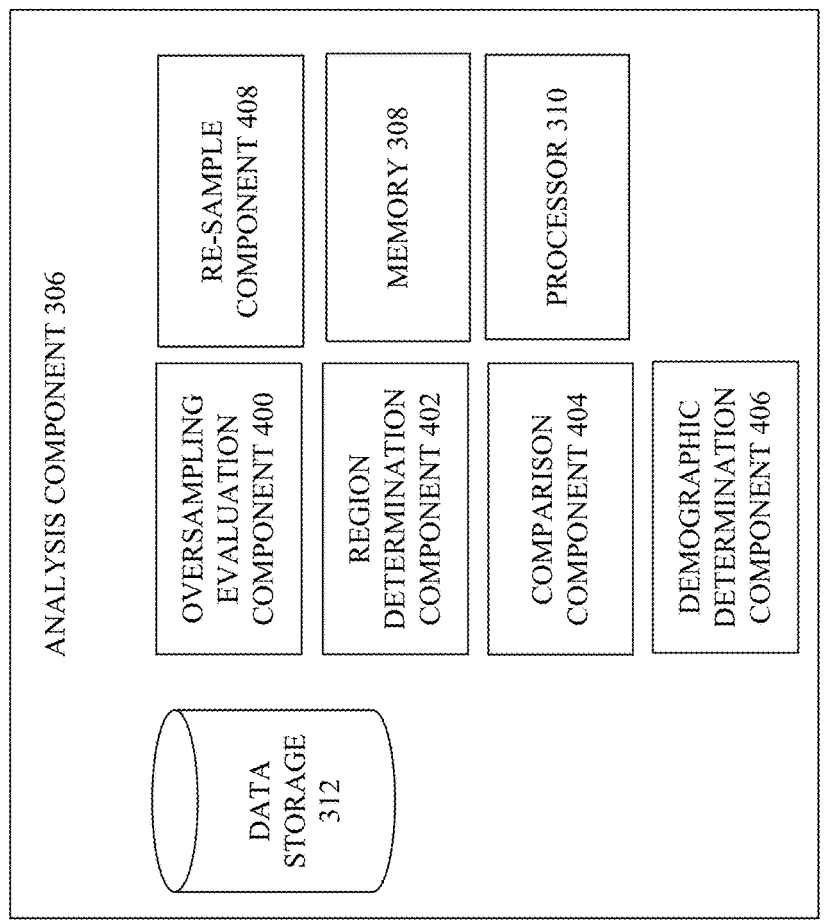
FIG. 4 illustrates an example block diagram of an analysis component of the assessment device of FIG. 3 in accordance with one or more embodiments described herein.
Figure 5:
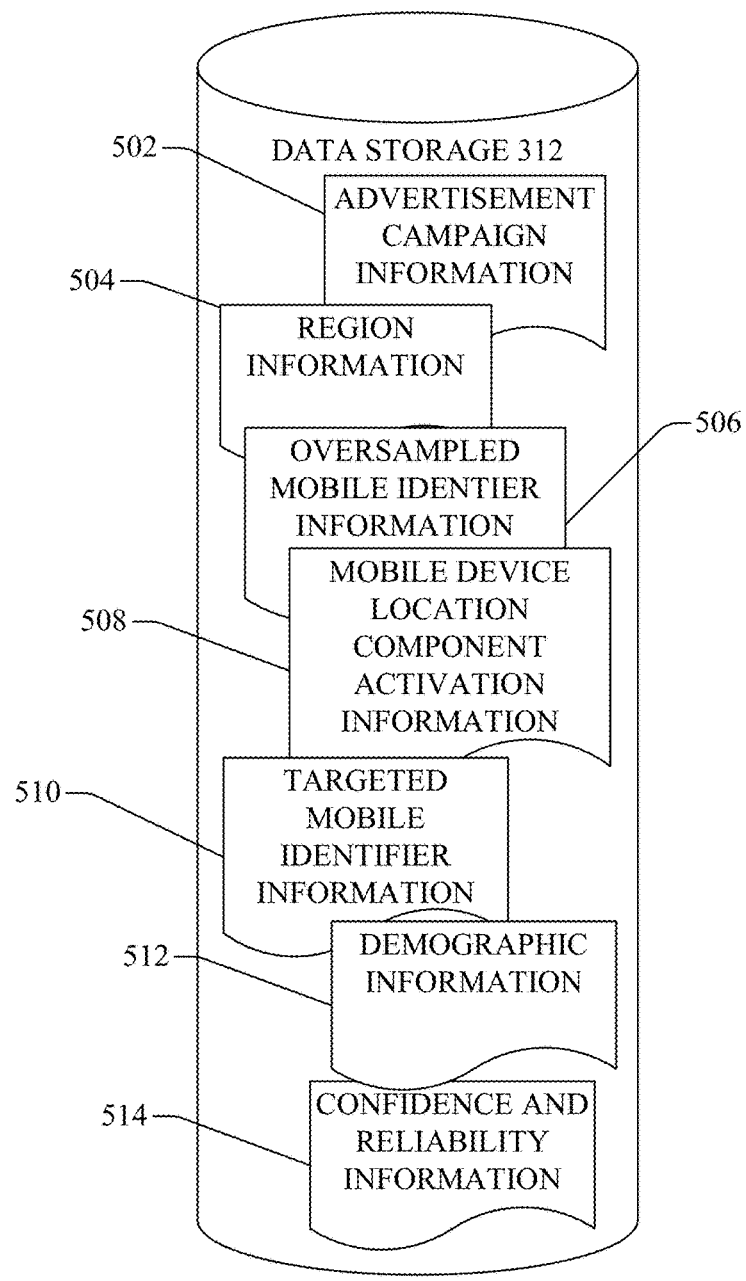
FIG. 5 illustrates an example block diagram of data storage of the assessment device of FIG. 3 in accordance with one or more embodiments described herein.

An example of an assessment device (e.g., assessment device 102) will be described in greater detail with reference to FIGS. 3, 4 and 5. FIG. 3 illustrates an example block diagram of an assessment device that can facilitate demographic assessment of information using targeted location oversampling in accordance with one or more embodiments described herein. FIG. 4 illustrates an example block diagram of an analysis component of the assessment device of FIG. 3 in accordance with one or more embodiments described herein. FIG. 5 illustrates an example block diagram of data storage of the assessment device of FIG. 3 in accordance with one or more embodiments described herein.

Assessment device 102 can comprise communication component 300, mobile device identification component 302, mobile device location component (MDLC) controller 304, analysis component 306, memory 308, processor 310 and/or data storage 312. In various embodiments, one or more of communication component 300, mobile device identification component 302, MDLC controller 304, analysis component 306, memory 308, processor 310 and/or data storage 312 can be electrically and/or communicatively coupled to one another to perform one or more functions of assessment device 102. Repetitive description of like elements employed in respective embodiments of systems and/or apparatus described herein are omitted for sake of brevity.

Communication component 300 can transmit and/or receive information from and/or at assessment device 102. For example, with reference in FIGS. 1 and 3, communication component 300 of assessment device 102 can receive information indicative of one or more of mobile devices 108, 110, 111, 112, 114 communicating via BSs associated with cell sites covering an area of first region 118 during a defined time period. For example, communication component 300 can receive information indicative of one or more of mobile devices 108, 110, 111, 112, 114 communicating via BSs associated with cell sites covering an area of first region 118 during a time period during which an event of interest (e.g., grand opening, sale, clearance) is occurring at a particular business entity located within first region 118 (and within second region 120, which is located within first region 118).

Communication component 300 of assessment device 102 can transmit information to mobile devices identified as being located in first region 118. The information transmitted can be indicative of a request for the mobile devices (or location information components of the mobile devices) identified as being located in first region 118 to power on and/or transmit GPS or other location information about the specific location of the mobile devices.

In some embodiments, communication component 300 of assessment device 102 can transmit information indicative of a control signal causing the mobile devices (or location information components of the mobile devices) identified as being located in first region 118 to power on and/or transmit GPS or other location information about the specific location of the mobile devices. For example, mobile device location control (MDLC) controller 304 of assessment device 102 can generate information indicative of a request to cause mobile devices identified as being located in the first region 118 to transmit location information and/or information indicative of a control signal to cause mobile devices identified as being located in the first region 118 to power on/activate and transmit location information.

In some embodiments, assessment device 102 can request, via mobile application, location information from the one or more mobile devices identified as being located within first region 118. In some embodiments, the mobile application, for example, can be an application that causes a mobile device (or location information component of a mobile device) to power on, identify and/or transmit the location of the nearest wireless fidelity (Wi-Fi) hotspot.

In some embodiments, through the use of the mobile application, which causes identification of the nearest Wi-Fi hotspot, assessment device 102 can facilitate determination of demographic information about identities associated with mobile devices that were in the vicinity of a point of interest 116 but did not go within point of interest 116 (for example, if there is a Wi-Fi hotspot to which the mobile device would have connected had the mobile device gone into point of interest 116).

In some embodiments, communication component 300 of assessment device 102 can transmit, to one or more of location/positioning component 122, 124, information indicative of a control signal causing the mobile devices (or location information components of the mobile devices) identified as being located in first region 118 to power on and/or transmit GPS or other location information about the specific location of the mobile devices.

In various embodiments, mobile device identification component 302 of assessment device 102 determines that mobile device 108 is not within first region 118 and therefore does not transmit a request for mobile device 108 to activate/transmit location information. By contrast, mobile device identification component 302 can determine that mobile devices 110, 111, 112, 114 are located within first region 118 and therefore determine that mobile devices 110, 111, 112, 114 (or location information components of the mobile devices) should be powered on to transmit location information. Accordingly, mobile device identification component 302 can enable assessment device 102 to determine the mobile devices in the larger, general proximity of point of interest 116 and an oversample of such mobile devices in first region 118 can be obtained.

In some embodiments, mobile device identification component 302 of assessment device 102 can consider the mobile devices identified as being within first region 118 as an indicator of mobile devices for which a defined likelihood exists that the mobile devices are within second region 120. For example, mobile device 108 will have a first likelihood of being located within second region 120 while mobile devices 110, 111, 112, 114 will have a second likelihood of being located within second region 120. The likelihood that mobile device 108 is located within second region 120 can be determined to be less than an acceptable value in some embodiments. As such, for efficiency, mobile device 108 is not targeted (and therefore not requested) to transmit location information for use by assessment device 102.

Assessment device 102 can also comprise analysis component 306. One embodiment of the structure and/or functionality of analysis component 306 will be described in further detail with reference to FIG. 4. Analysis component 306 can comprise oversampling evaluation component 400, region determination component 402, comparison component 404, demographic determination component 406, re-sample component 408, memory 308, processor 310 and/or data storage 312. Repetitive description of like elements employed in respective embodiments of systems and/or apparatus described herein are omitted for sake of brevity.

Region determination component 402 can determine and/or access one or more boundaries of first region 118 and/or second region 120. In some embodiments, region determination component 402 can determine and/or access the location of a point of interest (e.g., point of interest 116) and determine a first region (e.g., first region 118) and/or a second region (e.g., second region 120) based on the determination and/or access of the location of the point of interest.

For example, a coffee shop can be located at point of interest 116 within second region 120. Region determination component 402 can determine that the boundary of point of interest 116 should be 40 meters (m)×40 meters (m), for example. Region determination component 402 can determine that the boundaries for first region 118 should be another 50 m in every direction (e.g., for a total of 90 m in every direction for first region 118).

Oversampling evaluation component 400 can determine mobile devices that are located in first region 118. For example, oversampling evaluation component 400 can receive information regarding boundaries of first region 118 from region determination component 404 and/or can collect information about mobile devices in first region 118.

In some embodiments, oversampling evaluation component 400 can determine and/or access information about the identities of mobile devices within first region by employing the information about boundaries of first region 118 to identify one or more cell sites, or BSs, covering the area of first region 118 and determining, requesting, receiving and/or accessing information about mobile devices within the coverage area that are communicatively coupled to the one or more identified cell sites, or BSs, during a particular time period/day of interest. By way of example, but not limitation, oversampling evaluation component 400 can employ Network Event Locating System (NELOS) information or cell site identification (CID) information to determine a set of mobile devices to target for location reporting.

After identifying mobile devices within first region 118 (or within a coverage area of the identified cell sites, or BSs, communicatively coupled to the BSs at a defined time period/day, oversampling evaluation component 400 can generate a signal for communication component 300 of assessment device 102 to transmit a request or control signal to cause mobile devices in first region 118 to report location information for use by assessment device 102.

Based on the location information reported, oversampling evaluation component 400 can identify mobile devices located in second region 120. In some embodiments, oversampling evaluation component 400 can employ the use of a mobile application at mobile devices to determine whether the mobile devices are located within point of interest 116 (or at least are connected to the Wi-Fi hotspot located at point of interest 116).

Oversampling evaluation component 400 can receive and/or access location information for any number of the mobile devices in first region 118 that transmitted location information. In some embodiments, one or more mobile devices in first region 118 that receive a request or control signal associated with transmitting location information do not transmit location information (e.g., mobile device may have moved into a zone of low or no connectivity during the time when the mobile device would have received the request or control signal). As such, the set of mobile devices in first region 118 that transmit location information can be less than the number of mobile devices identified by oversampling evaluation component 400 for transmission of location information.

The mobile devices that transmit location information and are located within second region 120 can be identified by oversampling evaluation component 400 for collection of demographic information. As such, oversampling evaluation component 400 can generate information identifying the mobile devices in second region 120 for which demographic information should be obtained.

Demographic determination component 406 can determine, access and/or store demographic information about one or more mobile devices determined to be in second region 120. In various embodiments, demographic information can comprise, but is not limited to, income, marital status, family status (e.g., children/no children), ethnicity, age, residential address or the like. One or more of these types of demographic information can be determined, accessed and/or stored based on the specifications of the business entity requesting the information in association with the event of interest.

Comparison component 404 can compare the number of mobile devices for which demographic information has been or is scheduled to be determined, accessed and/or stored by demographic determination component 406 with the number of mobile devices for which demographic information will be retrieved to achieve a defined confidence or reliability measure for the demographic information. Comparison component 404 can output a signal to re-sample component 408 indicating whether enough demographic information has been determined, accessed and/or stored.

If comparison component 404 indicates that not enough demographic information has been determined, accessed and/or stored, re-sample component 408 can output a signal to cause oversampling component 400 to restart the process of obtaining location information from mobile devices in first region 118 and targeting, of those mobile devices in first region 118, a subset of mobile devices that are within second region 120.

The number of times that the process is repeated can be according to the number of times for producing a sufficiently large set of accurately located mobile devices within second region 120 (and/or demographic information for the accurately located mobile devices within second region 120).

In some embodiments, assessment device 102 can determine the number of mobile devices that must be identified as being within second region 120 to be able to conduct a study such as determining the demographic mix of persons visiting a specific store and/or repeat the process of oversampling a defined amount of time to achieve a particular number of results and/or achieve a particular confidence or reliability of obtained results. For example, if a retailer would like to know a number of people with income between $40,000-$50,000 who were within second region 120 during an advertisement campaign or other event of interest with confidence of 5-10 percent, assessment device 102 can determine the amount of data needed to generate the result with that type of confidence/reliability and can continue the process of oversampling mobile devices in first region 118 and targeting mobile devices in second region 120 until that defined amount of data about mobile device users in second region 120 is obtained.

Turning back to FIG. 3, memory 308 can be a computer-readable storage medium storing computer-executable instructions and/or information for performing the functions described herein with reference to assessment device 102 (or components of assessment device 102). For example, memory 308 can store computer-executable instructions that can be executed by processor 310 to perform oversampling, communication, evaluation, re-sampling, region determination, demographic determination, decision-making or other types of functions executed by assessment device 102 (or components of assessment device 102).

Processor 310 can perform one or more of the functions described herein with reference to assessment device 102 (or components of assessment device). For example, processor 310 can evaluate a number of mobile devices identified as within second region 120 and determine whether re-sampling will be performed. Any number of different functions described herein performed by assessment device 102 can be performed utilizing processor 310.

Data storage 312 can be described in greater detail with reference to FIG. 5. FIG. 5 illustrates an example block diagram of data storage of the assessment device of FIG. 3 in accordance with one or more embodiments described herein. As shown, data storage 312 can be configured to store information accessed, transmitted, received and/or processed by assessment device 102 (or any component of assessment device 102). By way of example, but not limitation, data storage 312 can store advertisement campaign information 502 (e.g., information about a business entity/retail establishment location of interest, time period/day(s) of a business entity event of interest/retail event of interest, boundaries of the business entity/retail location of interest or the like), region information 504 (e.g., first region and second region information, cell site identification information or the like), oversampled mobile identifier information 506 (e.g., mobile devices within first region 118), mobile device location component activation information 508 (e.g., control signal information for causing one or more mobile devices to activate location information component 202 of FIG. 2), targeted mobile identifier information 510 (e.g., information identifying mobile devices within second region 120 and/or mobile devices within second region for which demographic information is or will be collected), demographic information 512 (e.g., demographic information collected or accessed by assessment device 102) and/or confidence and reliability information (e.g., information regarding a defined confidence or reliability measure/value of the measure for demographic information).

FIGS. 6-9 illustrate example flowcharts of methods that facilitate content demographic assessment of information using targeted location oversampling in accordance with one or more embodiments described herein.

Figure 6:
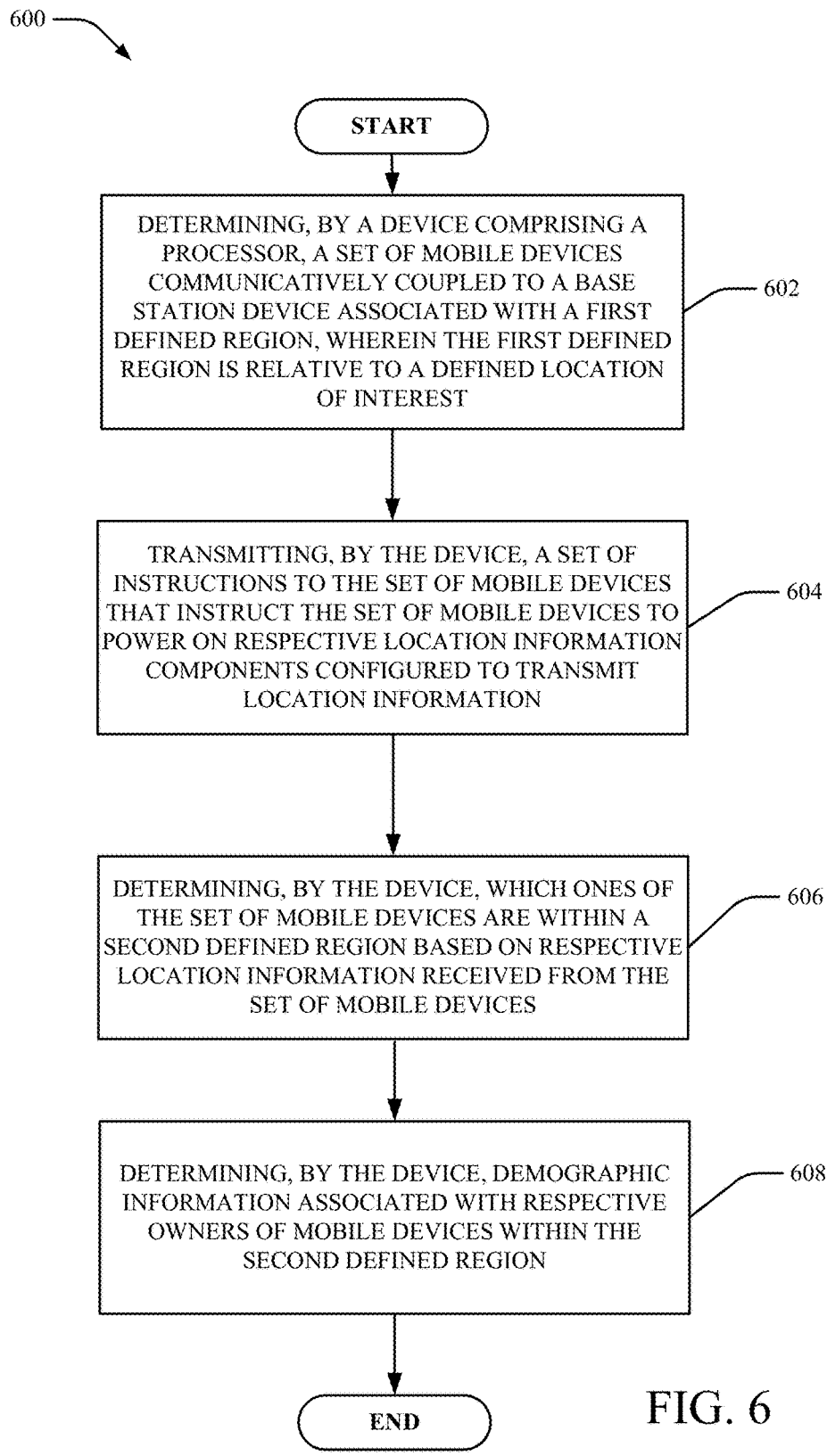
FIGS. 6-9 illustrate example flowcharts of methods that facilitate demographic assessment of information using targeted location oversampling in accordance with one or more embodiments described herein.

Turning first to FIG. 6, at 602, method 600 can comprise determining, by a device comprising a processor, a set of mobile devices communicatively coupled to a BS device associated with a first defined region, wherein the first defined region is relative to a defined location of interest. In some embodiments, determining the set of mobile devices comprises determining the set of mobile devices communicatively coupled to the BS device at a defined time. For example, the defined time can be a time associated with a retail event of interest (e.g., advertisement campaign, sale/clearance event, grand opening).

At 604, method 600 can comprise transmitting, by the device, a set of instructions to the set of mobile devices that instruct the set of mobile devices to power on respective location information components configured to transmit location information. In some embodiments, the respective location information components comprise respective components configured to transmit respective GPS information for the set of mobile devices.

At 606, method 600 can comprise determining, by the device, which ones of the set of mobile devices are within a second defined region based on respective location information received from the set of mobile devices. The second defined region can be a region located within the first defined region. As such, the retail event can be an advertisement campaign for a business located within the second region.

At 608, method 600 can also comprise determining, by the device, demographic information for respective identities associated with mobile devices within the second defined region.

Figure 7:
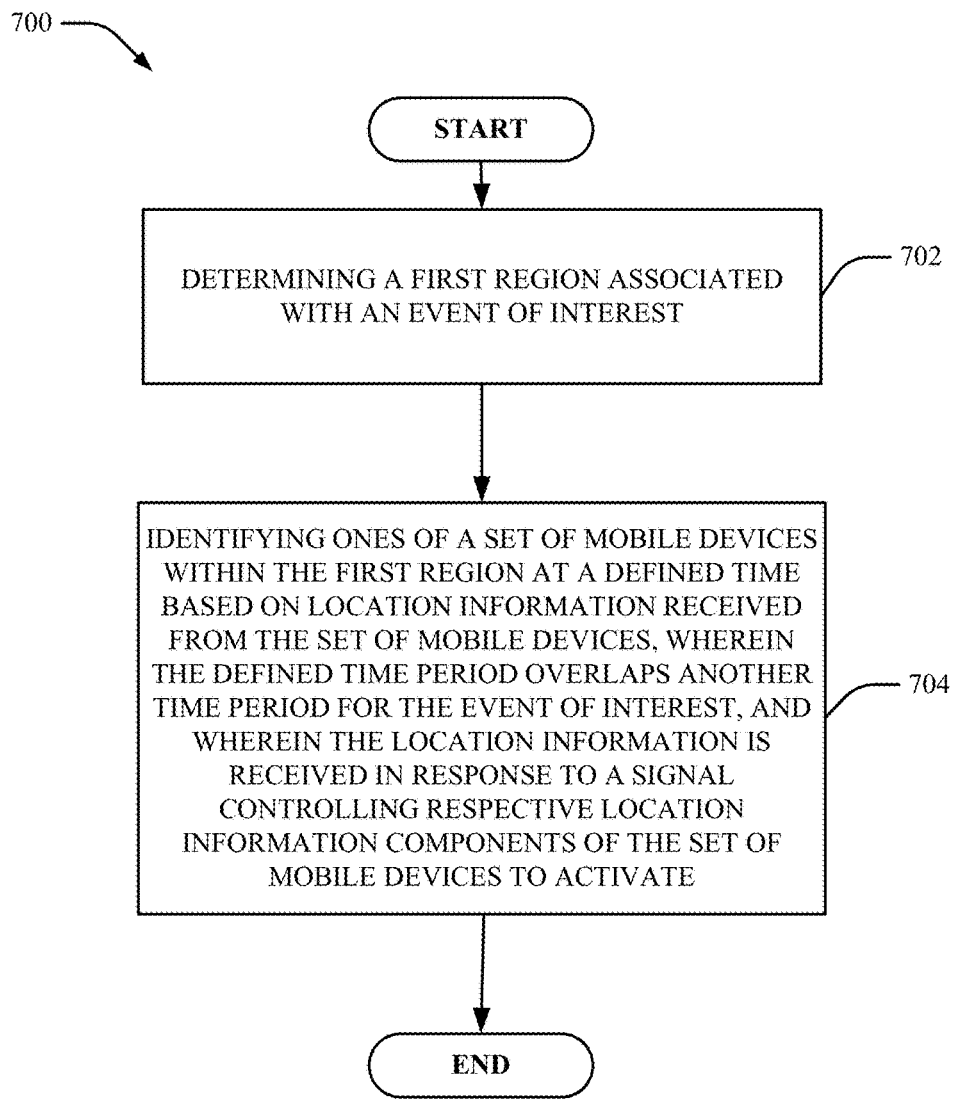

Turning now to FIG. 7, at 702, method 700 can comprise determining a first region associated with an event of interest. At 704, method 700 can comprise identifying ones of a first set of mobile devices within the first region within a defined time period based on location information received from the first set of mobile devices, wherein the defined time period overlaps another time period for the event of interest, and wherein the location information is received in response to a signal controlling respective location information components of the first set of mobile devices to activate.

Figure 8:
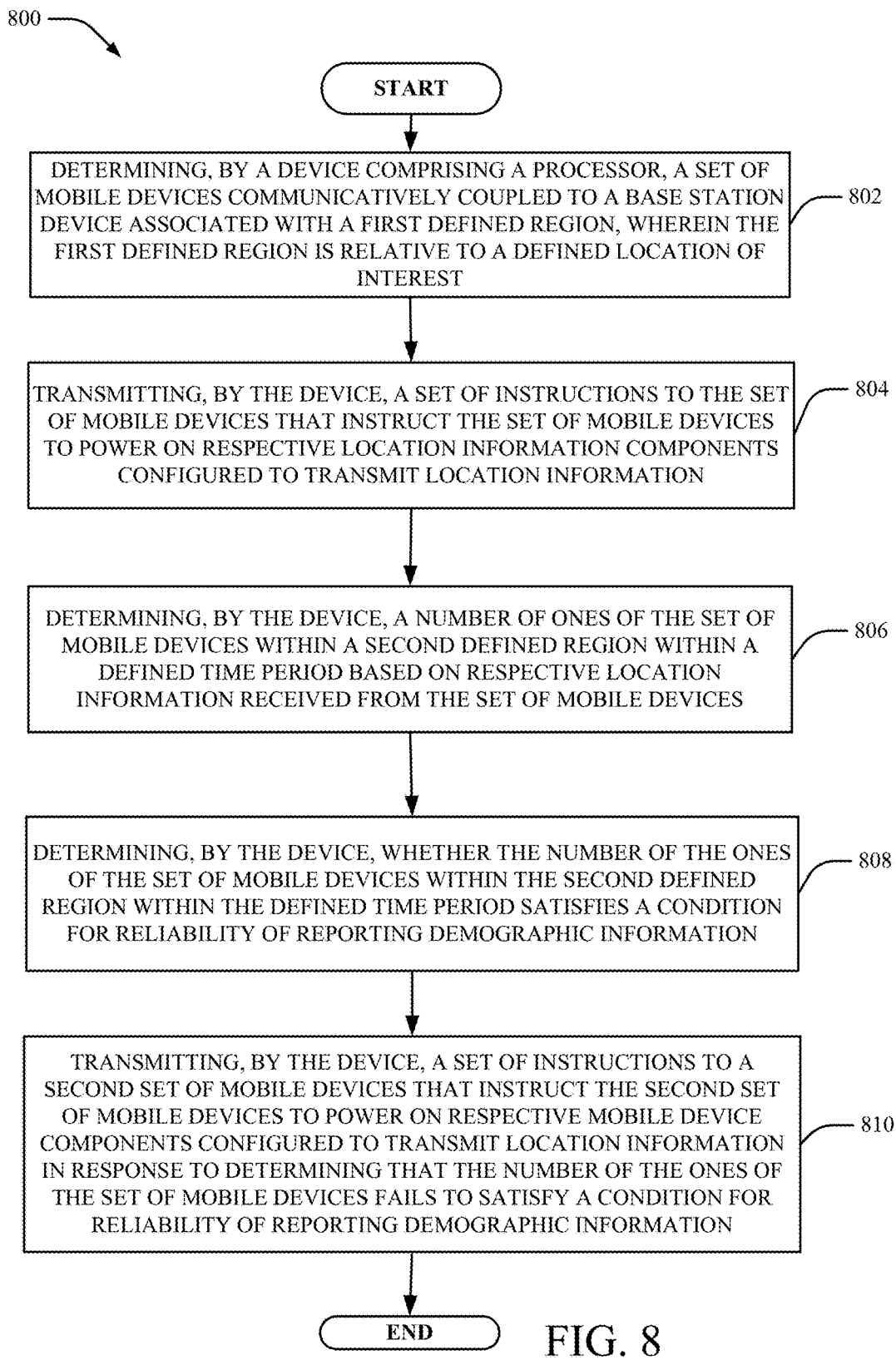

Turning now to FIG. 8, at 802, method 800 can comprise determining, by a device comprising a processor, a set of mobile devices communicatively coupled to a base station device associated with a first defined region, wherein the first defined region is relative to a defined location of interest. At 804, method 800 can comprise transmitting, by the device, a set of instructions to the set of mobile devices that instruct the set of mobile devices to power on respective mobile device components configured to transmit location information.

At 806, method 800 can comprise determining, by the device, a number of ones of the set of mobile devices within a second defined region within a defined time period based on respective location information received from the set of mobile devices. At 808, method 800 can comprise determining, by the device, whether the number of the ones of the set of mobile devices within the second defined region within the defined time period satisfies a condition for reliability of reporting demographic information.

At 810, method 800 can comprise transmitting, by the device, a set of instructions to a second set of mobile devices that instruct the second set of mobile devices to power on respective mobile device components configured to transmit location information in response to determining that the number of the ones of the set of mobile devices fails to satisfy a condition for reliability of reporting demographic information.

Figure 9:
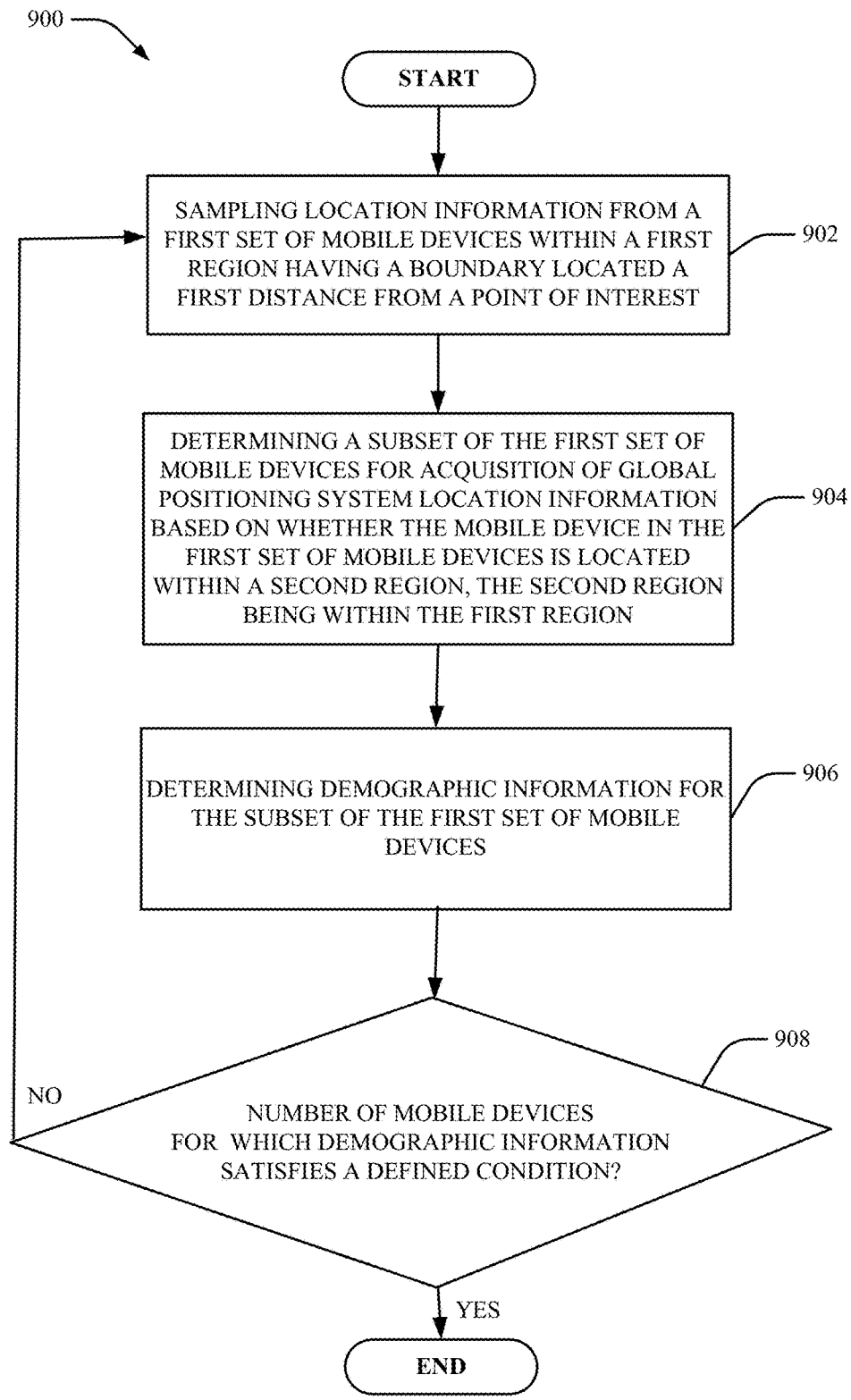

Turning now to FIG. 9, at 902, method 900 can comprise sampling location information from a first set of mobile devices within a first region having a boundary located a first distance from a point of interest. At 904, method 900 can comprise determining a subset of the first set of mobile devices for acquisition of GPS location information based on whether the mobile device in the first set of mobile devices is located within a second region, the second region being within the first region.

At 906, method 900 can comprise determining demographic information for the subset of the first set of mobile devices. At 908, method 900 can comprise determining whether the number of mobile devices for which demographic information is obtained satisfies a defined condition. For example, the defined condition can be meeting or exceeding a value representative of a measure of the confidence/reliability desired for the demographic information being provided to an entity associated with the event of interest. If the defined condition is not satisfied, method 900 can repeat at 902. If the defined condition is met, method 900 can end.

Figure 10:
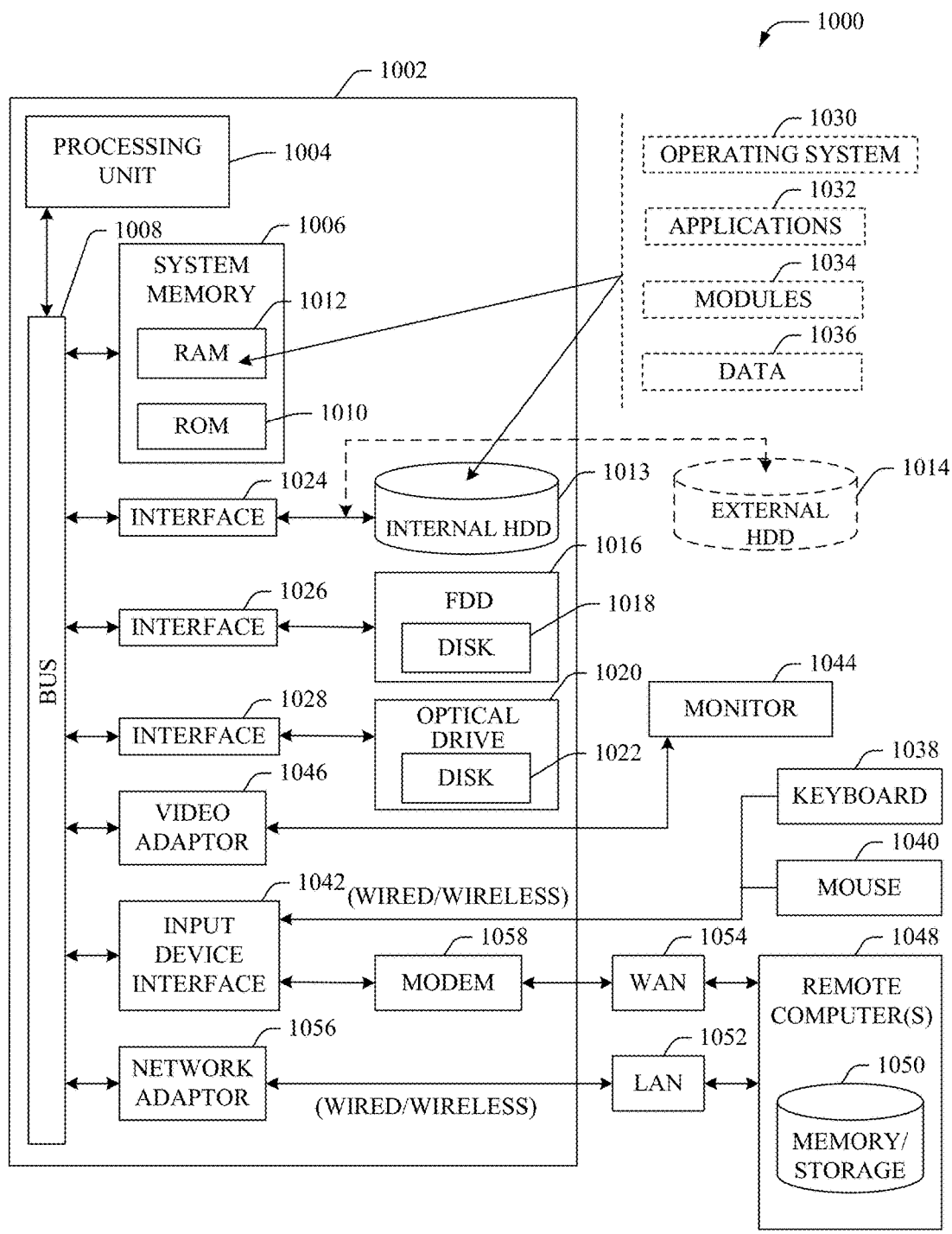
FIG. 10 illustrates a block diagram of a computer operable to facilitate demographic assessment of information using targeted location oversampling in accordance with one or more embodiments described herein.

FIG. 10 illustrates a block diagram of a computer operable to facilitate demographic assessment of information using targeted location oversampling in accordance with one or more embodiments described herein. For example, in some embodiments, the computer can be or be included within any number of components described herein including, but not limited to, assessment device 102 (or components of assessment device 102) and/or mobile device 114 (or components of mobile device 114).

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1013 (e.g., EIDE, SATA), which internal hard disk drive 1013 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device comprising a processor, mobile devices communicatively coupled to a base station device associated with a first defined region, wherein the first defined region is relative to a defined location of interest;
   determining, by the device, a time period during which a retail event of interest is scheduled to occur, wherein the determining the mobile devices comprises determining the mobile devices communicatively coupled to the base station device during the time period;
   transmitting, by the device, instructions to the mobile devices that instruct the mobile devices to power on respective location information components configured to transmit location information;
   determining whether a number of first ones of the mobile devices associated with first identities for which first demographic information is determined satisfies a defined condition, wherein the first ones are communicatively coupled to a cell site device;
   based on determining that the number of the first ones of the mobile devices associated with the first identities for which the first demographic information is determined fads to satisfy the defined condition;
   determining second ones of second mobile devices, wherein second ones are a subset of the first ones and are within a second defined region that comprises the first region within the time period, wherein the determining the second ones is based on sampling the first ones by utilizing cell site identification information to determine which of the first ones to target for the subset of the first ones, resulting in sampled first ones, and requesting information about the sampled first ones for the first defined region at a defined day; and
   determining a second demographic information for second identities associated with the second ones of the second mobile devices within the first defined region.

2. The method of claim 1, wherein the respective location information components comprise respective components configured to transmit respective global positioning system information for the mobile devices.

3. The method of claim 1, wherein the retail event of interest comprises an advertisement campaign for a business located within the second defined region.

4. The method of claim 1, wherein the second defined region is located within a boundary of the first defined region.

5. The method of claim 1, further comprising:
   determining, by the device, demographic information for respective identities associated with mobile devices of the mobile devices within the second defined region.

6. An apparatus, comprising:
   a processor; and
   a memory that stores executable instructions that, when executed by the processor, facilitate performance of operations, comprising:
   determining a group of mobile devices communicatively coupled to a base station device associated with a first region, wherein the first region is defined relative to a defined location of interest;
   determining information associated with a retail event of interest, wherein the information comprises a time of commencement of the retail event of interest, and wherein the determining the group of mobile devices comprises determining the group of mobile devices communicatively coupled to the base station device at the time determined to be associated with the retail event of interest;
   transmitting information that is to enable the group of mobile devices to activate respective location information components configured to transmit location information;
   determining whether a number of first ones of the group of mobile devices associated with first identities for which first demographic information is determined satisfies a defined condition, wherein the first ones are communicatively coupled to a cell site device associated with the first region; and
   based on determining that the number of the first ones of the group of mobile devices associated with the first identities for which the first demographic information is determined fails to satisfy the defined condition:
   determining a second demographic information for second identities associated with second ones of second mobile devices within the first region, wherein the determining the second demographic information for second identities is based on sampling the first ones by utilizing cell site identification information to determine targeted ones of the first ones to target for location reporting and requesting information about the targeted ones with respect to the first region on a defined day, and wherein the sampling the first ones is performed iteratively until a defined amount of the second identities is obtained.

7. The apparatus of claim 6, wherein the respective location information components comprise respective components configured to transmit respective location information for the group of mobile devices.

8. The apparatus of claim 6, wherein the retail event of interest comprises an advertisement campaign for a business located within the second region.

9. The apparatus of claim 6, wherein the second region is located within a boundary of the first region.

10. The apparatus of claim 6, wherein the retail event of interest comprises an advertisement campaign for a business located within the second defined region.

11. A non-transitory machine-readable storage medium, comprising executable instructions that, when executed by a processor, facilitate performance of operations, comprising:

determining a first region and a time associated with a retail event of interest; and identifying ones of first mobile devices within the first region within a defined time period comprising the time associated with the retail event of interest and based on location information received from the first mobile devices, and wherein the location information is received in response to a signal controlling respective location information components of the first mobile devices to activate;

determining whether a number of the ones of the first mobile devices associated with identities for which first demographic information is determined satisfies a defined condition; and based on determining that the number of the ones of the first mobile devices associated with the identities for which the first demographic information is determined fails to satisfy the defined condition:

identifying other ones of second mobile devices other than the ones of the first mobile devices within a second region that comprises the first region within the defined time period, and determining second demographic information for other identities associated with the other ones of the second mobile devices within the first region, wherein the determining the second demographic information for other identities is based on sampling targeted ones of the mobile devices within the first region that are targeted for location reporting and determining which of the targeted ones of the mobile devices do not transmit location information.

12. The non-transitory machine-readable storage medium of claim 11, wherein the operations further comprise:

determining the first demographic information for the identities associated with the first mobile devices within the first region.

13. The non-transitory machine-readable storage medium of claim 12, based on determining that the number of the ones of the first mobile devices associated with the identities for which the first demographic information is determined fails to satisfy the defined condition, the operations further comprise:

sampling the second mobile devices, wherein the sampling comprises generating information to enable the second mobile devices to activate other respective location information components and to transmit other respective location information of the other respective location information components.

14. The non-transitory machine-readable storage medium of claim 13, wherein the second region comprises a region covered by a base station device, and wherein the identifying further comprises identifying the other ones of the second mobile devices communicatively coupled to the base station device within the defined time period.

15. The non-transitory machine-readable storage medium of claim 11, wherein the operations further comprise:

initiating transmission of first demographic information and second demographic information associated with the retail event of interest.

16. The method of claim 5, wherein the demographic information comprises demographic information about incomes for the respective identities associated with mobile devices of the mobile devices within the second defined region.

17. The method of claim 5, wherein the demographic information comprises demographic information about residential addresses for the respective identities associated with mobile devices of the mobile devices within the second defined region.

18. The non-transitory machine-readable storage medium of claim 12, wherein the first demographic information for identities associated with the first mobile devices within the first region comprises demographic information about incomes for the identities associated with the first mobile devices within the first region.

19. The non-transitory machine-readable storage medium of claim 12, wherein the first demographic information for identities associated with the first mobile devices within the first region comprises demographic information about residential addresses for the identities associated with the first mobile devices within the first region.

\* \* \* \* \*